Dec. 26, 1967     R. A. STUDINSKI     3,360,318
DRAWER LOCKING SYSTEM AND LATCH THEREFOR
Filed May 13, 1966     6 Sheets-Sheet 1
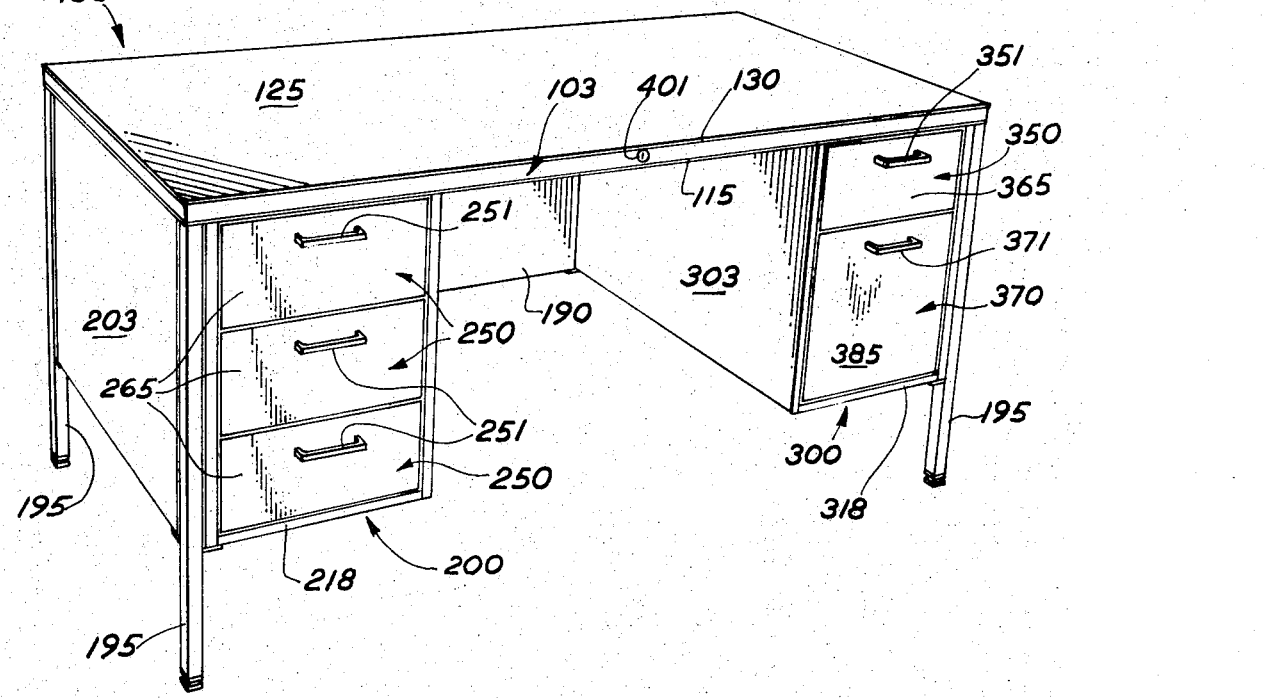
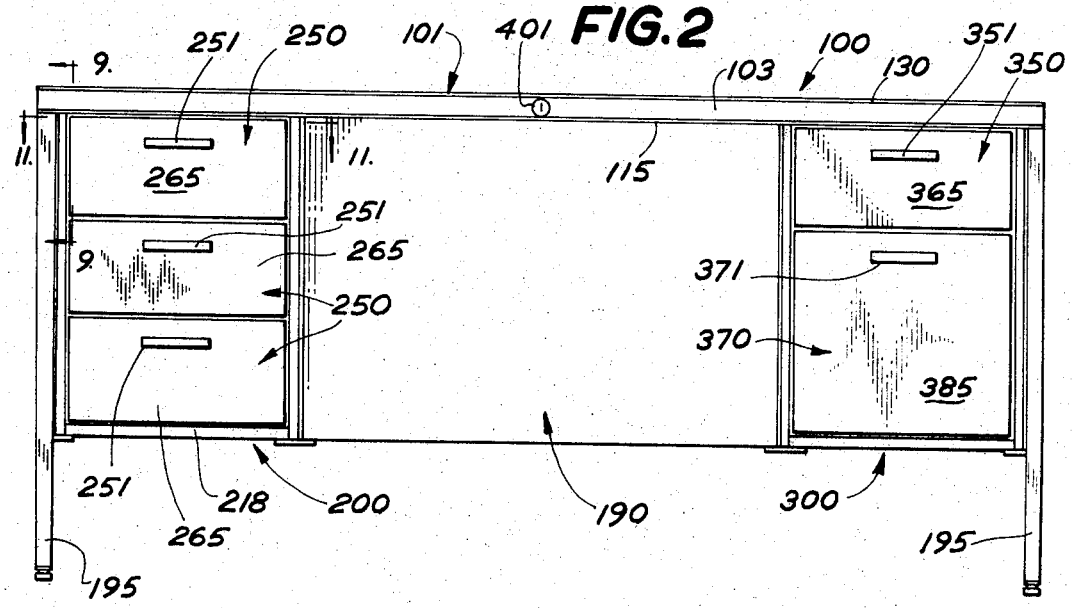
INVENTOR.
ROBERT A. STUDINSKI
BY Prangley, Baird, Clayton, Miller & Vogel
ATTYS.

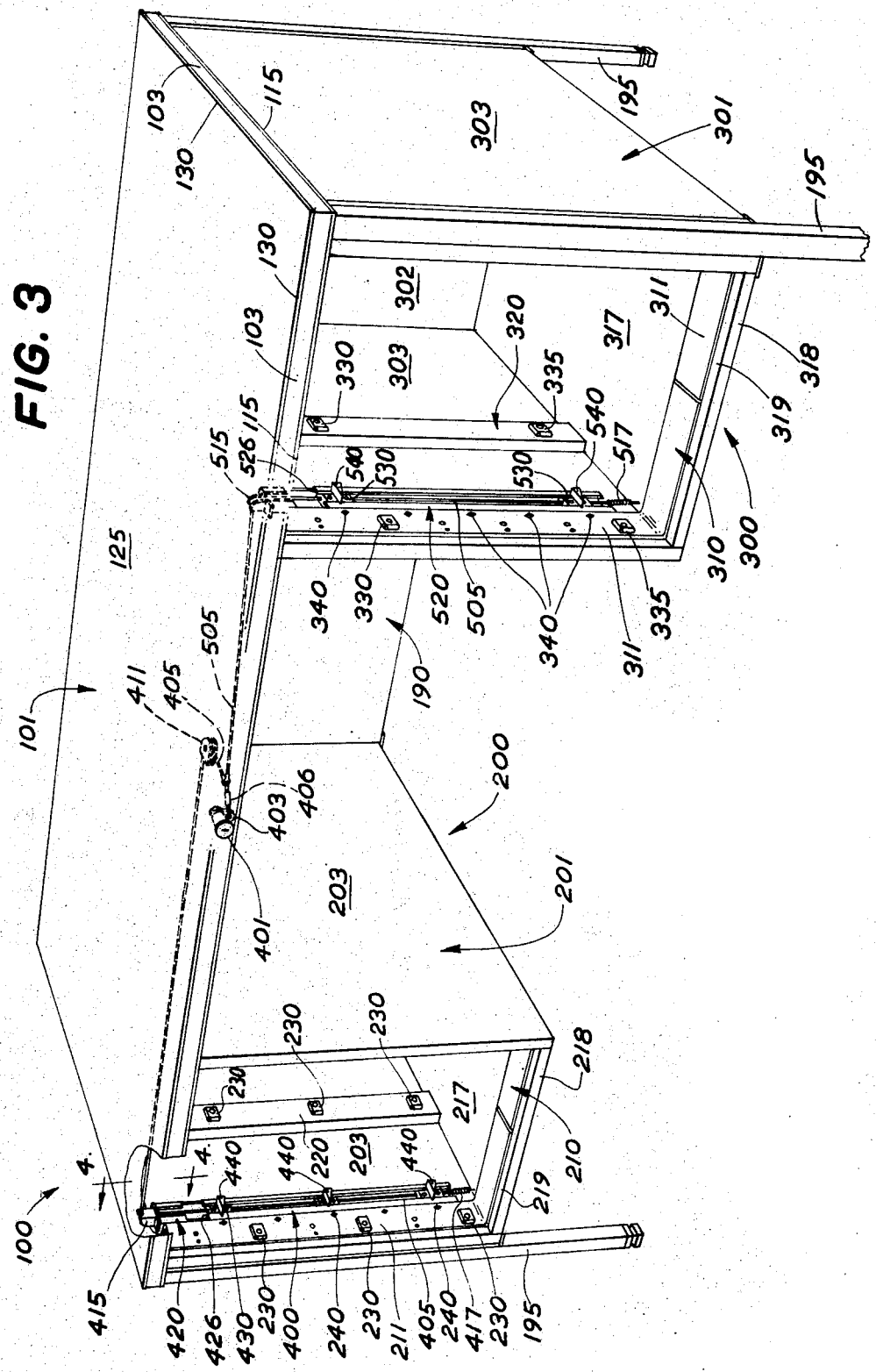

Dec. 26, 1967  R. A. STUDINSKI  3,360,318
DRAWER LOCKING SYSTEM AND LATCH THEREFOR
Filed May 13, 1966  6 Sheets-Sheet 3
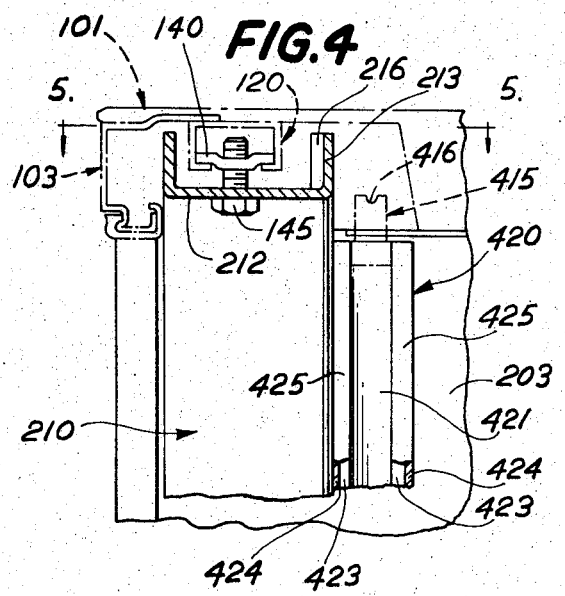
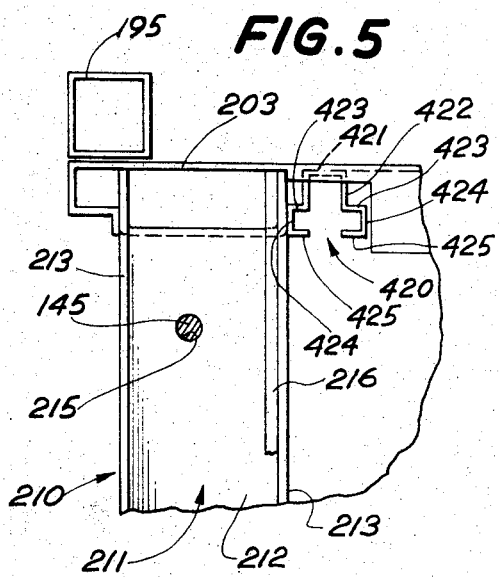
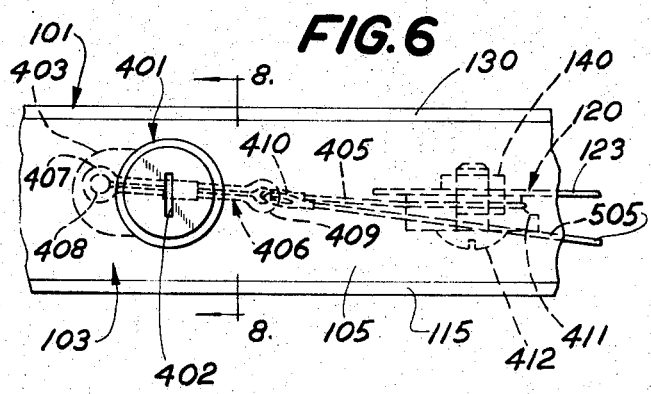
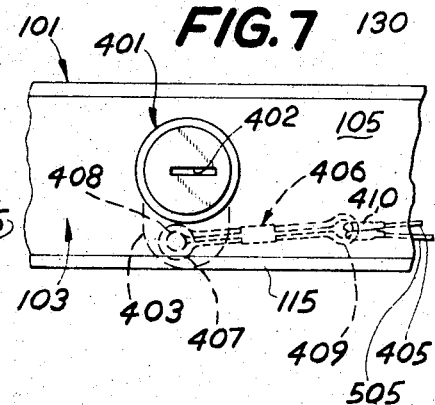
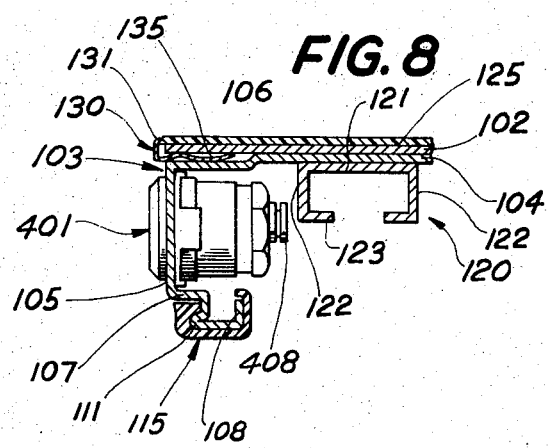

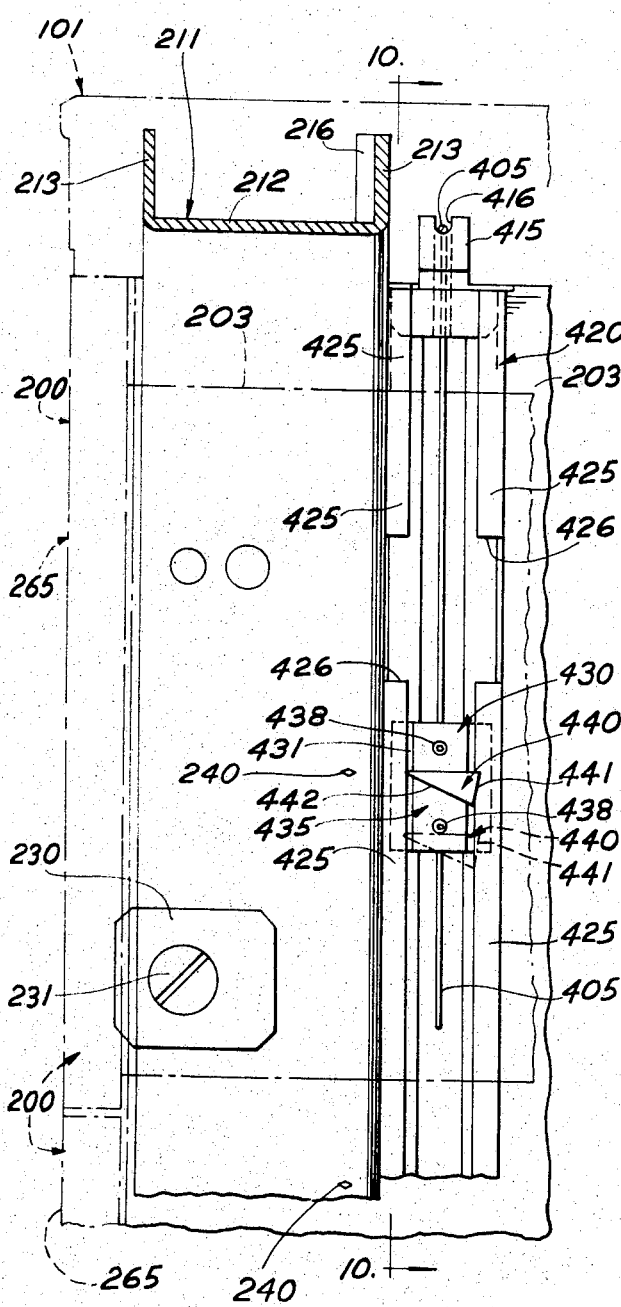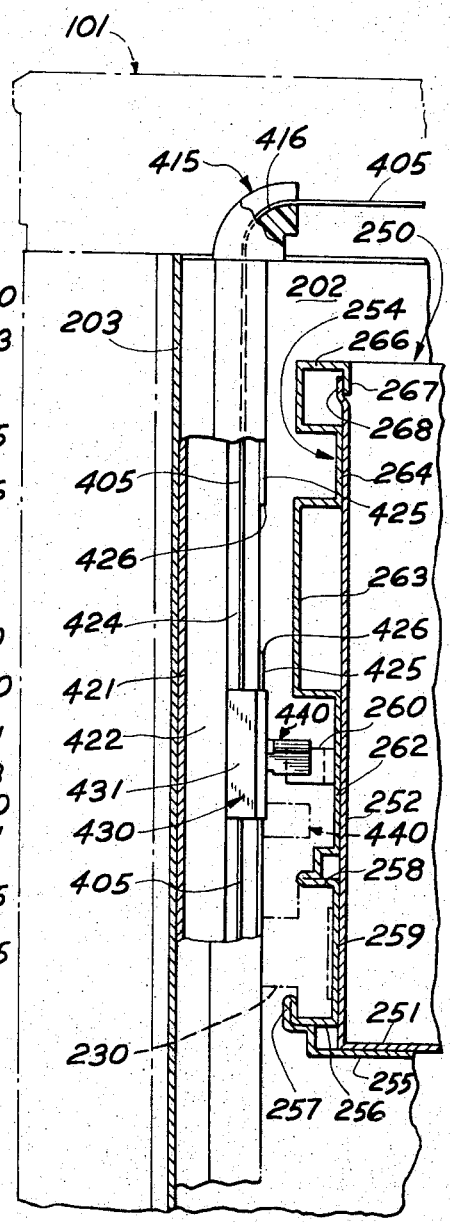

Dec. 26, 1967  R. A. STUDINSKI  3,360,318
DRAWER LOCKING SYSTEM AND LATCH THEREFOR
Filed May 13, 1966  6 Sheets-Sheet 6
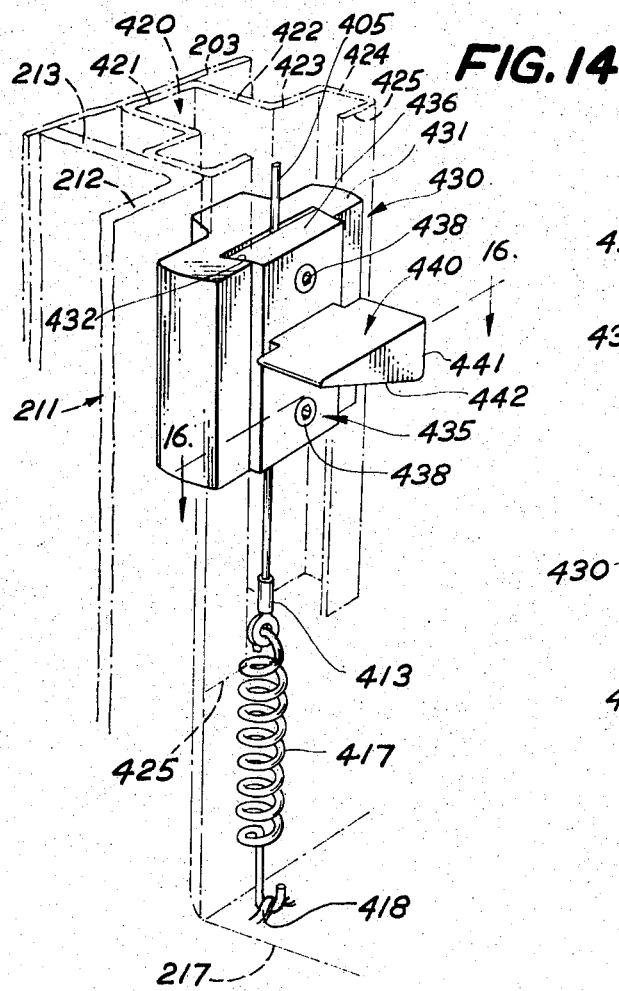
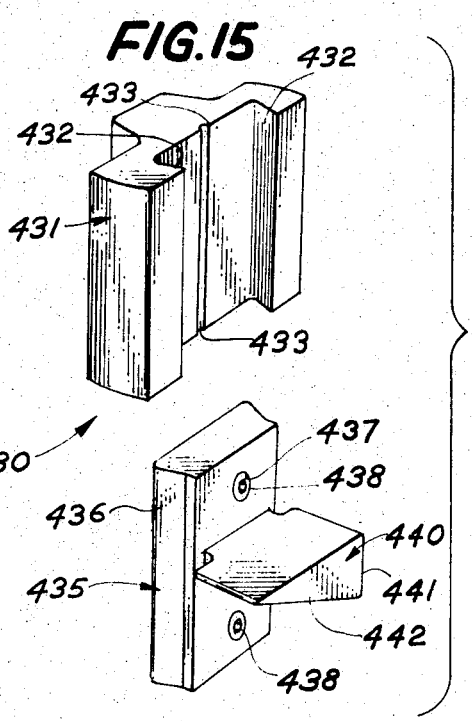
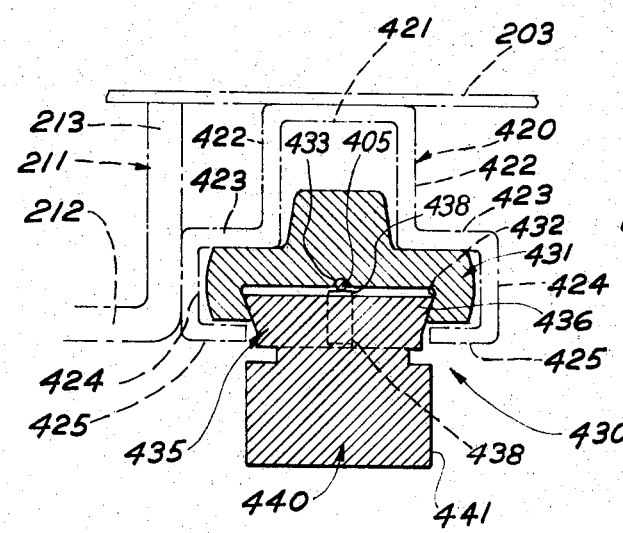

United States Patent Office 3,360,318
Patented Dec. 26, 1967

3,360,318
DRAWER LOCKING SYSTEM AND
LATCH THEREFOR
Robert A. Studinski, Aurora, Ill., assignor to Lyon Metal Products Incorporated, Aurora, Ill., a corporation of Illinois
Filed May 13, 1966, Ser. No. 549,979
24 Claims. (Cl. 312—217)

ABSTRACT OF THE DISCLOSURE

There is disclosed a drawer locking system for single pedestal desks and double pedestal desks, comprising a desk top, a first pedestal mounted below one end of the desk top and including a first body having a first drawer support structure therein, at least one first drawer mounted in the first pedestal and having a first keeper thereon, a second pedestal mounted below the other end of the desk top and including a second body having second drawer support structure therein, at least one second drawer mounted in the pedestal and having a second keeper thereon, lock mechanism mounted in the top and movable between a locked position and an unlocked position, a first cable extending through the first pedestal adjacent to the first drawer and having one end connected to the lock mechanism, a second cable extending through the second pedestal adjacent to the second drawer and having one end connected to the lock mechanism, first resilient means interconnecting the other end of the first cable and the first pedestal at a point below the first drawer to hold the first cable taut in all positions of the lock mechanism, second resilient means interconnecting the other end of the second cable and the second pedestal at a point below the second drawer to hold the second cable taut in all positions of the lock mechanism, a first latch mounted on the first cable and movable therewith between a locking position wherein the first latch is in position to engage the first keeper and a release position wherein the latch is out of the position to engage the first keeper, and a second latch mounted on the second cable and movable therewith between a locking position wherein the second latch is in position to engage the second keeper and a release position wherein the second latch is out of the position to engage the second keeper; there also is disclosed an improved latch construction mountable upon a flexible cable and adjustable therealong.

---

This invention relates to an improved drawer locking system for desks and the like, and also to an improved latch for use therein.

It is an important object of the present invention to provide an improved drawer locking system for a desk including a desk top, a pedestal mounted below the desk top and including a body having drawer support structure therein, at least one drawer mounted in the pedestal on the support structure for movement inwardly and outwardly with respect thereto and having a keeper thereon, lock mechanism mounted on the top and movable between a locked position and an unlocked position, a cable extending through the pedestal adjacent to the drawer and having one end connected to the lock mechanism, resilient means interconnecting the other end of the cable and the pedestal at a point below the drawer to hold the cable taut in all positions of the lock mechanism, and a latch mounted on the cable and movable therewith between a locking position wherein the latch is in position to engage the keeper and a release position wherein the latch is out of the position to engage the keeper, whereby movement of the lock mechanism between the locked position and the unlocked position thereof moves the latch between the locking position and the release position thereof.

In connection with the foregoing object, it is another object of the invention to provide an improved drawer locking system wherein the desk top has a dependent side flange and the lock mechanism is mounted on that side flange, suitable lubric guides being provided to guide the cable between the lock mechanism and the connection to the pedestal.

Another object of the invention is to provide an improved drawer locking system of the type set forth wherein a single lock mechanism simultaneously controls the locking of the drawers in both pedestals of a double pedestal desk, lubric guides being utilized to support and to direct two cables directed respectively to the two desk pedestals.

Yet another object of the invention is to provide an improved drawer locking system for desks of the type set forth, wherein the drawers are provided with stop arms adjacent to the rear thereof and in alignment with the latches when in the release position thereof, whereby the latches also serve as drawer stops when in the release position thereof to limit the normal outward movement of the drawer with respect to the associated pedestal, the drawer being released by the movement of the lock mechanism and the latches to the locking positions thereof.

Still another object of the invention is to provide in an improved drawer locking system of the type set forth new and improved structure for interconnecting the latches and the cables, the latches being readily mounted on and demountable from the cables, indicia also being provided on the pedestal to provide reference points for mounting and adjustment of the latches on the cable.

A further object of the invention is to provide an improved two piece latch for use in a drawer locking system of the type set forth.

Further features of the invention pertain to the particular arrangement and construction of the parts of the drawer locking system whereby the above-outlined and additional features are attained.

The invention, both as to its organization and method of operation, together with other objects and advantages, will best be understood by reference to the following specification taken in connection with the accompanying drawings, in which:

FIGURE 1 is a perspective view of a double pedestal desk incorporating therein a drawer locking system and embodying the principles of the present invention;

FIG. 2 is a front elevational view of the desk of FIG. 1;

FIG. 3 is a perspective view of the desk of FIGS. 1 and 2 with the drawers removed therefrom and with certain portions broken away better to illustrate the drawer locking system thereof;

FIG. 4 is a partial fragmentary view in vertical section along the line 4—4 of FIG. 3;

FIG. 5 is a view in horizontal section along the line 5—5 of FIG. 4;

FIG. 6 is an enlarged fragmentary view in front elevation of the lock mechanism forming a part of the drawer locking system of the present invention, the parts being shown in the locked position;

FIG. 7 is a view similar to FIG. 6 showing the parts in the unlocked position;

FIG. 8 is a fragmentary view in vertical section along the line 8—8 of FIG. 6;

FIG. 9 is a fragmentary enlarged view in vertical section along the line 9—9 of FIG. 2 with certain of the parts broken away and other parts shown in dashed lines;

FIG. 10 is a view in vertical section with certain portions broken away along the line 10—10 of FIG. 9;

FIG. 14 is an enlarged perspective view of the improved latch forming a part of the present invention together with the lower end of the cable and spring associated therewith, a portion of the latch channel in which the latch moves being illustrated in phantom lines;

FIG. 15 is an exploded perspective view of the parts forming the latch of FIG. 14; and FIG. 16 is a view in horizontal section through the latch of FIG. 14 along the lines 16—16 thereof.

Figure 11:
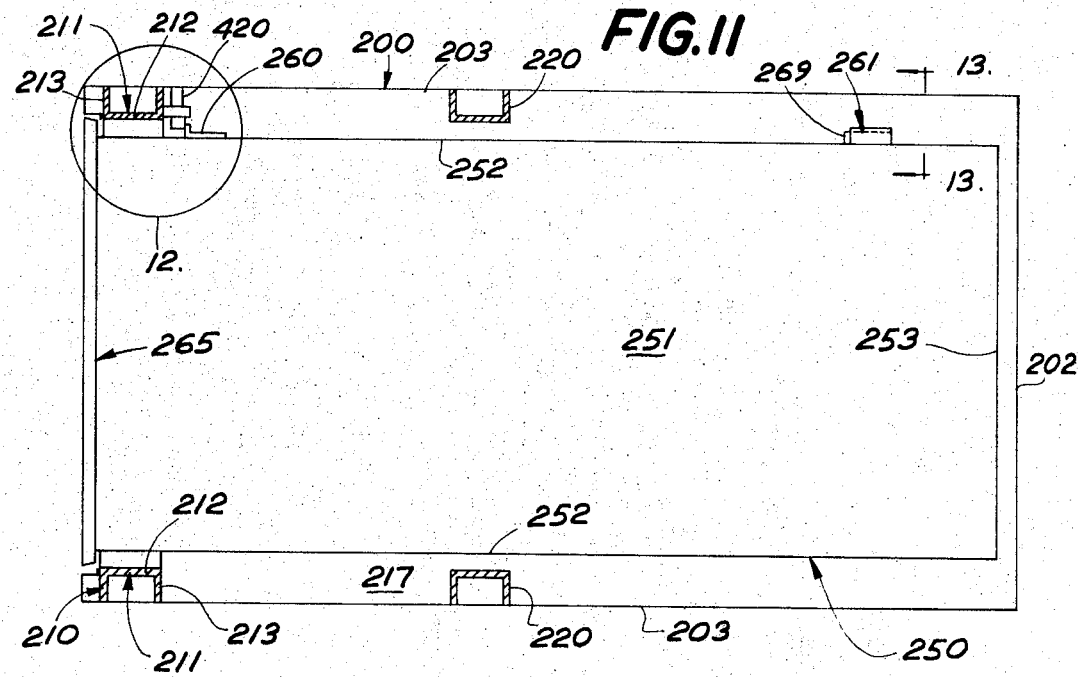
FIG. 11 is an enlarged schematic view in horizontal section along the line 11—11 of FIG. 2 showing the relationship of the drawer to the pedestal.
Figure 12:
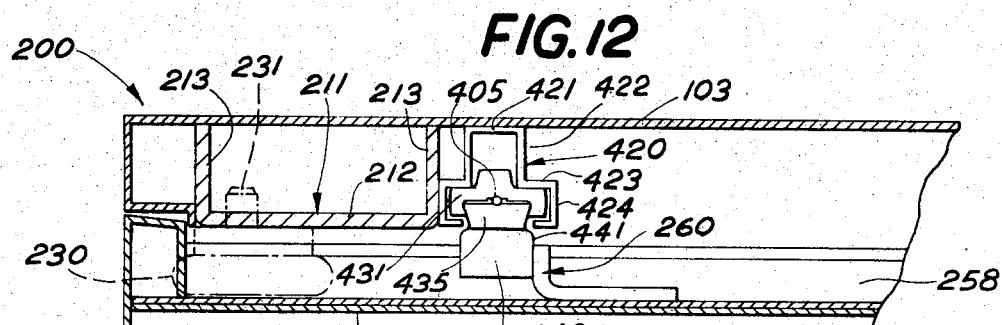
FIG. 12 is an enlarged view of that portion of FIG. 11 contained within the circle designated 12.

There is illustrated in FIGS. 1 to 3 of the drawings a double pedestal desk 100 in which is incorporated the improved drawer locking system of the present invention. The desk 100 includes a desk top 101 at the lefthand end of which is disposed a first pedestal 200 and at the righthand end of which is disposed a second pedestal 300, the pedestals 200 and 300 being connected at the rear by a back panel 190, four legs 195 disposed at the four corners of the desk 100 being provided to support it above an underlying support surface. The pedestal 200 has three vertically arranged box drawers 250 therein each provided with a pull 251, and the pedestal 300 has a box drawer 350 in the upper portion thereof provided with a pull 351 and a file drawer 370 in the lower portion thereof provided with a pull 371.

Referring to FIGS. 1 to 4 and 8 of the drawings, additional details of construction of the desk top 101 will be described. There is provided a generally flat top plate 102 formed of sheet metal and generally rectangular in shape, the periphery of the top plate 102 being essentially the same as the periphery of the desk top 101. Disposed beneath the top plate 102 and extending around the periphery thereof is an edging 103 also formed of sheet metal, a substantially flat piece of sheet metal having been deformed to provide an attachment flange 104, a side flange 105, a mounting flange 106, a bottom flange 107 and a pair of trim mounting flanges 108 and 111. More specifically, the attachment flange 104 is disposed against the underside of the top plate 102 but is spaced inwardly with respect to the outer edge thereof, the outer edge of the attachment flange 104 carrying thereon the mounting flange 106 which is offset downwardly away from the underside of the top plate 102. As illustrated, the side flange 105 is integral with the mounting flange 106 and depends therefrom, the lower edge carrying the inwardly directed bottom flange 107 which in turn carries the trim mounting flanges 108 and 111.

Also mounted beneath the top 101 are two longitudinally extending and substantially parallel and spaced apart mounting channels 120, each mounting channel 120 including a longitudinally extending main wall 121 and a pair of depending side flanges 122 carrying on the lower ends thereof respectively inturned holding flanges 123. All of the other parts of the desk 100 are mounted upon the desk top 101 by means of the mounting channels 120. Disposed on the upper surface of the top plate 102 is a covering 125, preferably formed of a synthetic organic resin, the preferred materials being those sold under the trademarks "Textolite," "Micarta" and "Formica." An adhesive is applied both to the upper surface of the top plate 102 and to the lower surface of the covering 125 to provide a good bond therebetween, the preferred adhesive being a synthetic rubber resin adhesive of the contact type such as that sold under the trademark "D–500" by Armstrong Cork Company, the two parts being oven heated to about 200° F. to drive off the volatile ingredients in the adhesive.

To complete the desk top 101, a lower decorative trim 115 is provided around the periphery of the lower portion of the edging 103 and an upper decorative trim 130 is provided along the edge of the top plate 102. Referring first to the lower trim 115, it is shaped and formed to fit upon and to be supported by the trim mounting flanges 108 and 111 on the edging 103, the trim being preferably formed of synthetic organic plastic resin, one preferred material being an acrylonitrile-butadiene-styrene copolymer (ABS) such as those sold under the trademarks "Abson," "Kralastic" and "Cycolac," another preferred material being high-impact polystyrene. The upper trim 130 is preferably formed of sheet metal, the preferred material being stainless steel. A single sheet of metal is bent to provide an outer wall 131 and a mounting tongue 135, the outer wall 131 being disposed generally vertically and extending inwardly to contact the edge of the covering 125. The lower edge of the outer wall 131 extends downwardly at least to the top of the edging 103 and carries thereon the mounting tongue 135 which is resiliently held between the top plate 102 and the mounting flange 106.

Referring to FIGS. 3 to 5 and 9 to 13, the details of construction of the pedestal 200 will be described. The pedestal 200 includes a body 201 including a substantially rectangular rear wall 202 (see FIG. 11), a pair of substantially rectangular side walls 203 extending forwardly therefrom and disposed substantially perpendicular thereto and parallel to each other. Disposed in the forward portion of the pedestal 200 is a front frame 210 formed from two substantially C-shaped channels 211 which in turn are substantially U-shaped in cross section (see FIG. 4) each including a main wall 212 and a pair of integral side flanges 213 extending normal thereto and parallel to each other. The free ends of the C-shaped channels 211 are disposed toward each other and a splice channel (not shown) is placed in bridging relationship therebetween and secured thereto as by welding. Four L-shaped gusset plates 216 are disposed respectively at the four corners of the frame 210 and on the inner edge of the rearmost side flange 213 and secured thereto as by welding.

The front frame 210 is in turn secured to the pedestal side walls 203 by welding, a layer of mastic (not shown) being disposed therebetween to provide sound deadening. A bottom wall 217 is also provided in the pedestal 210, the bottom wall 217 being supported by flanges (not shown) on the side wall 203, the forward end of the bottom wall 217 carrying an upturned front flange 218 having on the upper edge thereof a rearwardly directed end flange 219 that is disposed in close proximity to the forward surface of the front frame 210. Also mounted on the side walls 203 of the pedestal 200 and spaced from but disposed toward the front frame 210 is a pair of drawer supports 220 (see FIG. 3), the drawer supports 220 being connected to the side walls 203 as by welding.

In order to mount the pedestal 200 beneath the desk top 101, provision is made for connecting to the mounting channels 120 on the underside of the desk top 101, the pedestal 200 being connected at the front end thereof through the front frame 210 to the forward one of the mounting channels 120 and being in a similar manner connected at the rear end thereof to the rear mounting channel 120. Referring specifically to FIGS. 4 and 5 of the drawings, it will be seen that the front frame 210 is provided with openings 215 therethrough which receive bolts 145 engaging special nuts 140 disposed in the associated mounting channel 120, thereby to interconnect the front frame 210 to the front mounting channel 120. The rear of the pedestal 200 is connected in a like manner to the rear mounting channel 120.

Referring now to FIGS. 9 to 13 of the drawings, certain additional details of a representative box drawer 250 will be described. The box drawer 250 includes a bottom wall 251 (see FIG. 10) that is substantially rectangular in shape (see FIG. 11) and has a width slightly less than the interior width of the pedestal 200 and has a length slightly less than the length of the pedestal 200. Disposed on the longitudinally extending side edges of the bottom wall 251 are upstanding inner side walls 252, the side walls 252 being disposed substantially parallel to each other and normal to the bottom wall 251 and extending substantially the entire length thereof. Interconnecting the rear ends of the bottom wall 251 and the inner side walls 252 is a rear wall 253, all the walls named being mutually interconnected. Each of the inner side walls 252 in addition includes and carries thereon an outer side wall generally designated by the numeral 254, each of the outer side walls 254 including a bottom flange 255, a lower support flange 256, a retaining flange 257, an upper support flange 258 and a connecting wall 259 disposed between the support flanges 256 and 258. It will be understood that a single piece of sheet metal is shaped to provide the various parts named, the bottom flange lying beneath the bottom wall 251 and being secured thereto as by welding, and the connecting wall 259 lying against the surface of the associated side wall 252 and being secured thereto as by welding. The two support flanges 256 and 258 are disposed parallel to each other and normal to the drawer side walls and extend laterally outwardly with respect thereto; and the retaining flange 257 extends upwardly substantially normal to the support flanges 256 and 258 and is spaced outwardly a predetermined distance with respect to the connecting wall 259, the support flanges 256 and 258 and the retaining flange 259 extending substantially the entire length of the drawer 250. Extending upwardly from the upper support flange 258 is a connecting section 262 on the upper end of which is an integral outstanding reinforcement section 263 and above which is a connecting section 264 carrying an upper outstanding reinforcement section 266 that carries on the inner portion thereof a downturned flange 267 disposed adjacent to an outwardly offset flange 268 on the upper edge of the associated inner side wall 252. It is noted that both sides of the box drawer 250 carry an outer side wall 254 described above and in the interest of brevity, the other side wall 254 will not be described, but like reference numerals are applied to like parts thereof. Finally, the forward end of the drawer 250 is closed by a drawer head 265 (see FIG. 12) closing the area bounded by the bottom wall 251 and the forward ends of the side walls 252.

Each of the box drawers 250 is supported within the pedestal 200 for movement between a storage position and an extended position on four glides 230 disposed between the support flanges 256 and 258 thereof. More specifically, a first pair of the glides 230 is mounted in horizontal alignment on the front frame 210 and specifically on the vertical portions of the channels 211 (see FIGS. 3 and 9) and a second pair of the glides 230 is mounted in horizontal alignment on the drawer supports 220. The glides 230 are preferably formed of a lubric material such as a synthetic organic plastic resin, a preferred resin being an acetal resin such as that sold under the trademark "Delrin," and are held in the mounted position by cooperating bolts 231 passing through openings therein and engaging threaded openings in the channels 211 and the drawer supports 220, respectively. In order to cooperate with the locking system 400 to be described more fully hereinafter, there is provided on one side of each of the drawers 250 adjacent to the forward end thereof a keeper 260 extending laterally outwardly therefrom (see FIGS. 10, 11 and 12), and disposed adjacent to the rear thereof is an outwardly extending stop arm 261 (see FIGS. 11 and 13).

The pedestal 300 at the righthand end of the desk 100 has substantially the same construction as the pedestal 200 described above, and accordingly, like reference numerals in the 300 series have been applied to corresponding parts throughout the several figures of the drawings. Likewise, the drawer 350 has the same construction as the drawers 250, and therefore like reference numerals in the 350 and 360 series have been applied to corresponding parts throughout the drawings. Finally, the drawer 370, although it is in the form of a file drawer, has fundamentally the same construction as the drawers 250 and 350, and therefore, reference numerals in the 370 and 380 series have been assigned to corresponding parts throughout the several figures of the drawings.

A locking system 400 is provided for locking the drawers 250 within the pedestal 200 in the storage positions thereof, and also for locking the drawers 350 and 370 within the pedestal 300 in the storage positions thereof. To this end a lock 401 has been provided in the front edging 103 of the desk top 101, and specifically in the downwardly extending flange 105 thereof, the lock 401 being disposed generally centrally of the desk top 101 and midway between the pedestals 200 and 300. The usual key opening 402 has been provided (see FIGS. 6 and 7), whereby upon the insertion of the proper key into the lock 401, the parts can be turned between the positions illustrated in FIGS. 6 and 7, the parts in FIG. 6 being in the locked position thereof and the parts in FIG. 7 being in the unlocked position thereof. The lock 401 includes a lever arm 403 which in the operation of the lock 401 by means of a key in the key opening 402 is moved from between the position illustrated in FIG. 6 and the position illustrated in FIG. 7.

In order to make connection with the drawers in the pedestal 200, a first flexible steel cable 405 is provided having a terminal 410 on one end thereof which is connected to the lever arm 403 by means of a cable locking connector 406, the connector 406 more particularly having a first end 407 connected by a pin 408 to the outer end of the lever arm 403 and having a second end 409 receiving the terminal 410 thereon for connection thereto, the connector 406 facilitating the ready assembly of the parts and disassembly and removal of the cable 405 with respect to the lever arm 403, and also for connecting to two cables for a double pedestal installation as illustrated and as will be described more fully hereinafter. The cable 405 passes around a cable guide 411 disposed to the right of the lock 401 (see FIGS. 3 and 6), thereby to reverse the direction of the cable 405. The cable guide 411 is preferably formed of a lubric material such as a synthetic organic plastic resin, the preferred resin being an acetal resin sold under the trademark "Delrin," the guide 411 being fed around the cable guide 411, the cable 405 is the desk top mounting channels 120 by means of a bolt 412 passing therethrough and engaging one of the special nuts 140 disposed in the mounting channel 120. After being fed around the cable guide 411, the cable 405 is guided across a latch channel cable guide 415 and downwardly in a vertical direction through a latch channel 420 mounted on the outer side wall 203 of the pedestal 200, and specifically on the inner surface thereof immediately to the rear of the front frame 210. The lower end of the cable 405 carries a second terminal 413 (see FIG. 14) and is secured to the pedestal bottom wall 217 by means of a resilient spring 417, the spring 417 having one end thereof connected to the lower cable terminal 413 and having the other end thereof connected to the pedestal bottom wall 217 by means of a loop 418 formed from the pedestal bottom wall.

Further details of the construction and arrangement of the latch channel cable guide 415 and the latch channel 420 will be given by reference to FIGS. 4, 5, 9 and 10 of the drawings. The latch channel 420 includes a main wall 421 that is suitably secured as by welding to the inner side of the pedestal side wall 203 immediately to the rear of the front frame 210. Extending forwardly from the vertically extending edges of the main wall 421 is a pair of side walls 422 from which extend laterally outwardly a pair of first retaining flanges 423 from the outer edges of which extend inwardly directed support flanges 424 on the inner edges of which are a pair of inturned second retaining flanges 425. Adjacent to the upper end of the latch channel 420 (see FIGS. 9 and 10), the second retaining flanges 425 are provided with cutouts 426 therein for insertion of latches as will be described more fully hereinafter. The latch channel cable guide 415 is fixedly secured to the upper end of the latch channel 420 and has a curved bearing surface 416 that directs the cable 405 through a 90° angle turn so as to direct the cable downwardly and along the length of the latch channel 420.

Referring to FIG. 3, it will be seen that disposed within the latch channel 420 are three latches 430, a latch 430 being provided for each of the box drawers 250 within the pedestal 200. All of the latches 430 are of identical construction, whereby only one will be described in detail with special reference to FIGS. 14 to 16 of the drawings. Each of the latches 430 includes a guide block 431 having an essentially rectangular body with dimensions in a horizontal direction to fit between the retaining flanges 423 and 425 on the latch channel 420 and between the support flanges 424 thereof for ready sliding movement along the channel provided by the latch channel 420. The vertical sides of the guide block 431 are rounded as at 434 to provide a single line contact down the length thereof on either side for smooth guiding contact. Formed in the side of the block 431 disposed inwardly into the pedestal 200 and toward the adjacent side of the associated drawer 250 is a dovetail recess 432 extending longitudinally throughout the entire height of the guide block 431 and disposed substantially centrally thereof and in alignment with the opening between the inner edges of the front retaining flanges 425. Also provided centrally of the guide block 431 and extending vertically therealong is a cable receiving groove 433, the depth of the groove 433 being slightly less than the diameter of the associated cable 405, but the cross section of the groove 433 being such as to receive the cable 405 therein. The rear side of the guide block 431 carries a strengthening rib 439 thereon extending outwardly between but spaced from the side walls 422. Cooperating with the guide block 431 is a latch block 435 that is also generally rectangular in shape and has a vertical extent substantially equal to that of the guide block 431 but has a width centrally thereof such as to fit between the opposed inner edges of the front retaining flanges 425. Formed on the side of the latch block 435 disposed toward the guide block 431 is a vertically extending dovetail tenon that is shaped complementary to the dovetail recess 432 in the guide block 431, the tenon 436 being disposed in the recess 432 when the parts are assembled as illustrated in FIGS. 14 and 16. Two vertically spaced apart openings 437 are provided through the latch block 435 and are threaded to receive therein a pair of set screws 438, respectively, the set screws 438 extending rearwardly beyond the latch block 435 and being in general horizontal alignment with the cable 405 and bearing against the cable 405 as is illustrated best in FIG. 16. By bearing against the cable 405, the set screws 438 serve to lock the cable 405 with respect to the guide block 431 and with respect to the latch block 435, thereby to position and fixedly to mount the latch 430 upon the cable 405. The described action of the screws 438 also presses the guide block 431 and the latch block 435 away from each other, thereby to urge the cooperating dovetail surfaces thereof into tight engagement one with the other, thereby fixedly to position the guide block 431 with respect to the latch block 435.

Finally, there is mounted generally centrally of the latch block 435 an inwardly extending latch 440, preferably integral therewith and shaped to provide a first substantially flat and generally vertically arranged abutment surface 441 and a second generally flat but rearwardly and downwardly inclined cam surface 442. As can be best seen in FIGS. 9 and 10 of the drawings, the abutment surface 441 on the latch 440 can be positioned in a locking relationship with respect to the associated drawer when it is in the closed position thereof. More specifically, when the latch 440 is in the upper or latching position thereof as illustrated by the solid lines in FIG. 10, the abutment surface 441 thereof is in horizontal alignment with and immediately disposed in front of the keeper 260 (see FIG. 11 also), whereby the drawer 250 is locked in the storage position thereof. However, when the latch 440 is moved to the release position thereof illustrated by the dashed lines in FIG. 10, it is out of alignment with the keeper 260, whereby the drawer 250 may be moved between the storage and extended positions thereof. The necessary movement of the latch 440 between the latching and release positions thereof is obtained by the operation of the lock 401 to move the parts from the locked position illustrated in FIG. 6 to the unlocked position illustarted in FIG. 7, the movement of the attachment point between the cable 405 and the lever arm 403 being sufficient as illustrated in FIG. 10 when transmitted by the cable 405 to cause the necessary vertical movement of the latch 440, the spring 417 more specifically pulling the lower end of the cable 405 and all of the latches 430 thereon downwardly thus carrying the latch members 440 therewith. It further is pointed out that such movement of the parts is rendered extremely easy due to the fact that the cable guides 411 and 415 are formed of a lubric material as described above.

Figure 13:
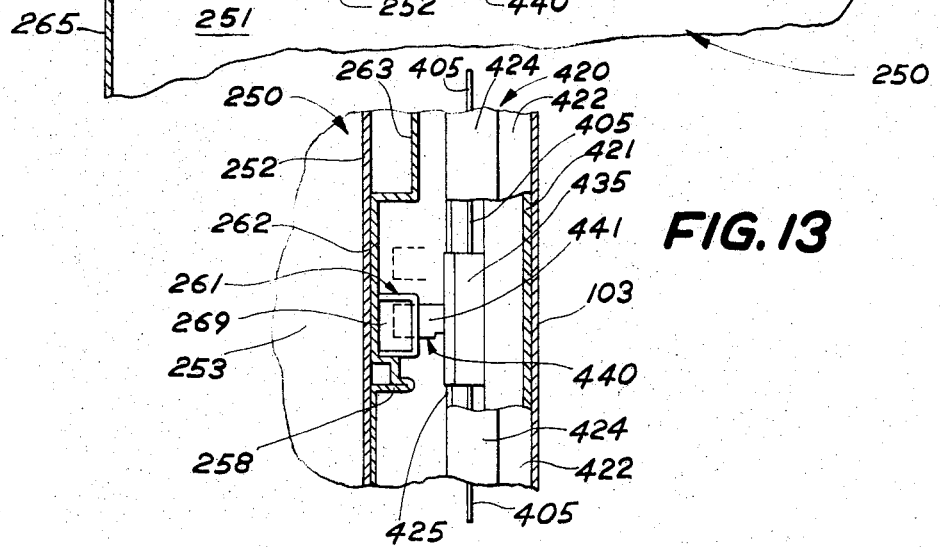
FIG. 13 is an enlarged fragmentary view in vertical section with certain portions broken away along the line 13—13 of FIG. 11.

The latch members 440 also serve as an outer stop to limit the distance that the drawers 250 can be withdrawn from the pedestal 200 without complete removal thereof. Referring particularly to FIGS. 11 and 13 of the drawings, it will be seen that the stop arm 261 on each of the drawers 250 is essentially U-shaped and is attached to the outer side wall of the associated drawer and in horizontal alignment with the associated latch member 440 when it is disposed in the release position thereof, i.e., the lowermost position thereof illustrated by solid lines in FIG. 13 and by dashed lines in FIG. 10. Mounted in the stop arm 261 is a rubber bumper 269, and accordingly, upon withdrawal of the drawer 250 from the pedestal 200, the bumper 269 abuts against the abutment surface 441 on the latch member 440, thereby to limit the withdrawal of the drawer from the pedestal 200. However, should it be desired completely to remove a drawer 250 from the pedestal 200, the locking system 400 need only be moved to the locking position after partial withdrawal of the drawer that it is desired to remove, such movement of the parts to the locking position shifting the latch member 440 to the upper or locked position illustrated by solid lines in FIG. 10 and dashed lines in FIG. 13 so that the stop arm 261 and the bumper 269 carried thereby can now clear the latch member 440, whereby the drawer 250 can be completely removed from the pedestal 200.

Due to the fact that the latch members 400 are continually urged toward the lower position thereof by means of the spring 417, each of the latch members 440 can be momentarily shifted upwardly by the application of suitable force to the cam surfaces 442 thereof. For example, when one of the drawers 250 is in the partially open or extended position thereof, and thereafter the locking system 400 is placed in the locked position thereof so as to move the latch members 440 to the upper or locked position thereof, the latch members 440 will be in longitudinal alignment with the keepers 260. However, the keeper 260 on the partially extended drawer has the upper edge thereof disposed slightly below the upper edge of the associated latch member 440 when it is in the latching position thereof, whereby the upper edge of the keeper 260 engages the cam surface 442, thereby to move the latch member 440 and the associated parts upwardly against the action of the spring 417 until the keeper passes behind the abutment surface 441 on the latch member 440, after which the spring 417 automatically returns the latch member 440 to the latching position to engage in front of the keeper 260 and to prevent subsequent withdrawal of the drawer 250 until the latch member 440 is moved to the lower or release position thereof.

The parts of the locking system 400 used to lock the drawers 350 and 370 in the closed positions thereof within the pedestal 300 are substantially identical to the parts of the system described above for locking the drawers 250 in the closed positon within the pedestal 200; accordingly, like reference numerals in the 500 series have been applied to like parts of the locking system for the pedestal 300 that correspond to parts in the 400 series used in connection with the pedestal 200. More specifically, and referring to FIGS. 3, 6 and 7 of the drawings the connector 406 carries on the second end 409 thereof in addition to the terminal 410 on the cable 405 a terminal 510 on one end of a cable 505, the cable 505 extending directly to the right from the connector 406 and passing over a latch channel cable guide 515 and extending downwardly through a latch channel 520, the lower end of the cable 505 being connected by a spring 517 to the bottom wall 317 of the pedestal 300. Mounted at suitable adjusted positions on the cable 505 are two latches 530 having thereon latch members 540. The upper latch member 540 engages a keeper (not shown) and a stop arm (not shown) on the box drawer 350 in the pedestal 300, while the lower latch member 540 engages a keeper (not shown) and a stop arm (not shown) on the file drawer 370. The various parts of the locking system associated with the pedestal 300 work in the same manner and cooperate in the same way as similar numbered parts of the locking system associated with the pedestal 200.

An important feature of the present invention resides in the simplicity of the installation of the various parts of the locking system 400 and the adjustment thereof to accommodate different assemblies of drawers within the pedestals 200 and 300. In assembling the desk 100, the pedestals 200 and 300 are first attached to the desk top 101 via the mounting channels 120 and the nuts 140 and the bolts 145. The necessary glides 230, 330 and 335 are then mounted in the operative position. Next the cables 405 and 505 are connected to the connector 406 and then threaded through the respective cable guides 405 and 415 on the one hand and 515 on the other hand and thence downwardly through the associated latch channels 420 and 520. The lower ends of the cables 405 and 505 are then connected to one end of the springs 417 and 517, respectively, the other ends of the springs being connected to the pedestal bottom walls 217 and 317, respectively. Next it is desired to assemble the latches 430 and 530 onto the cables 405 and 505 respectively. Referring first to the latches 430, a guide block 431 is first inserted through the cutout portion 426 adjacent to the upper end of the latch channel 420 and positioned behind the cable 405, after which an associated latch block 435 is connected thereto and the screws 438 driven inwardly loosely to mount the latch 430 upon the cable 405. In order to assist in positioning the latches 430 along the cable 405, an indicia in the form of a diamond shaped cutout 240 is provided at each of the possible drawer latch positions, six such positions being available in the event that six half drawers are mounted in the pedestal 200. The indicia 240 more specifically are positioned at points disposed above the glides 230 and at the point at which the forward shorter end of the latch member 440 should be positioned to cooperate with the keeper and stop arm on an associated drawer. Accordingly, in order properly to position the latch 430, it is necessary for the workmen simply to move the latch 430 downwardly along the cable 405 until the forward end of the latch member 440 is opposite the diamond-shaped indicia 240 above the lowermost drawer support glide 230, for example. The set screws 438 are then tightened fixedly to lock the latch 430 upon the cable 405 and fixedly to position the guide block 431 with respect to the latch block 435. The latch member 440 is now in proper position to engage the keeper 260 and the stop arm 261 on the associated drawer 250. Each of the other latches 430 is likewise assembled through the cutout 426 and moved to the associated adjusted position and then tightened upon the cable 405.

The latches 530 and the cable 505 are likewise assembled through the cutout 526 in the latch channel 520, diamond-shaped indicia 340 also being provided along the front frame 310 to serve as guides for positioning the forward ends of the latch members 540. The workman therefore slips the assembled but loosely tightened latch 530 downwardly to the appropriate indicia 340, after which the screws in the latch 530 are tightened to clamp the latch 530 to the cable 505. The latch member 540 is now in the proper position with respect to the keeper and stop arm on an associated drawer 350 or 370, as the case may be.

If the arrangement of the drawers within the pedestals 200 and 300 is to be changed, it will be appreciated that the latches 430 and 530 can also be quickly changed, the latches being shifted or disassembled or new latches installed as required. It further is possible readily to replace the cables 405 and 505 due to the provision of the connector 406 and the simple connections to the springs 417 and 517 at the other ends of the respective cables.

From the above description it will be seen that there has been provided an improved drawer locking system 400 which fulfills all of the objects and advantages set forth above. More specifically, an improved locking system has been provided wherein the cable 405 or 505 is continually under tension throughout the length thereof, one end being connected to the lock 401 and the other end being connected by the springs 417 and 517, respectively, to the bottoms of the pedestals 200 and 300, respectively. Both of the cables are actuated from the same lock 401, the connections of the ends of the cable to the lock 401 and to the springs at the other ends thereof being such as to facilitate ready installation and replacement thereof if required. Novel latches 430 and 530 have been provided which can be installed at any desired point along that portion of the cables disposed within the associated latch channels 420 and 520, the latches being readily installed, adjusted, replaced and removed without molesting the tension or adjustment of the associated cables 405 or 505, as the case may be. Furthermore, suitable indicia 240 and 340 have been provided on the associated pedestal frames to assist in properly positioning the latches 430 and 530, respectively.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A drawer locking system for a desk comprising a desk top, a pedestal mounted below said desk top and including a body having drawer support structure therein, at least one drawer mounted in said pedestal on said support structure for movement inwardly and outwardly with respect thereto and having a keeper thereon, lock mechanism mounted on said top and movable between a locked position and an unlocked position, a cable extending through said pedestal adjacent to said drawer and having one end connected to said lock mechanism, resilient means interconnecting the other end of said cable and said pedestal at a point below said drawer to hold said cable taut in all positions of said lock mechanism, and a latch mounted on said cable and spaced from the ends thereof and said resilient means and movable with said cable between a locking position wherein said latch is in position to engage said keeper and a release position wherein said latch is out of the position to engage said keeper, whereby movement of said lock mechanism between the locked position and the unlocked position thereof moves said latch between the locking position and the release position thereof, said latch being vertically adjustable with respect to both said cable and said resilient means.

2. The drawer locking system set forth in claim 1, wherein said cable is a flexible wire cable.

3. The drawer locking system set forth in claim 1, wherein said resilient means is a spring having one end connected to said cable at a point below said drawer and having the other end connected to a lower point on said pedestal.

4. The drawer locking system set forth in claim 1, and further comprising a plurality of drawers mounted in said pedestal on said support structure, a corresponding plurality of keepers respectively mounted on said drawers, and a corresponding plurality of latches mounted on said cable and movable therewith between locking positions wherein said latches are in positions respectively to engage said keepers and release positions wherein said latches are out of the positions respectively to engage said keepers.

5. A drawer locking system for a desk comprising a desk top including a substantially flat top plate, an edging extending around the periphery of said top plate and including a dependent side flange, a pedestal mounted below said desk top and including a body having drawer support structure therein, at least one drawer mounted in said pedestal and on said support structure for movement inwardly and outwardly with respect thereto and having a keeper thereon, lock mechanism mounted on said side flange and movable between a locked position and an unlocked position, a latch channel mounted in said pedestal adjacent to the path of movement of said drawer, a cable having one end connected to said lock mechanism and extending to said latch channel and downwardly therethrough, resilient means interconnecting the other end of said cable and said pedestal at a point below said drawer to hold said cable taut in all positions of said lock mechanism, and a latch mounted on said cable and spaced from the ends thereof and said resilient means for reciprocating movement therewith in said latch channel between a locking position wherein said latch is in a position to engage said keeper and a release position wherein said latch is out of the position to engage said keeper, whereby movement of said lock mechanism between the locked position and the unlocked position thereof moves said latch between the locking position and the release position thereof.

6. The drawer locking system set forth in claim 5, wherein said latch is vertically adjustable with respect to said cable within said latch channel.

7. A drawer locking system for a double pedestal desk comprising a desk top, a first pedestal mounted below one end of said desk top and including a first body having a first drawer support structure therein, at least one first drawer mounted in said first pedestal on said first support structure for movement inwardly and outwardly with respect thereto and having a first keeper thereon, a second pedestal mounted below the other end of said desk top and including a second body having second drawer support structure therein, at least one second drawer mounted in said second pedestal on said second support structure for movement inwardly and outwardly with respect thereto and having a second keeper thereon, lock mechanism mounted on said top and movable between a locked position and an unlocked position, a first cable extending through said first pedestal adjacent to said first drawer and having one end connected to said lock mechanism, a second cable extending through said second pedestal adjacent to said second drawer and having one end connected to said lock mechanism, first resilient means interconnecting the other end of said first cable and said first pedestal at a point below said first drawer to hold said first cable taut in all positions of said lock mechanism, second resilient means interconnecting the other end of said second cable and said second pedestal at a point below said second drawer to hold said second cable taut in all positions of said lock mechanism, a first latch mounted on said first cable and movable therewith between a locking position wherein said first latch is in position to engage said first keeper and a release position wherein said latch is out of the position to engage said first keeper, and a second latch mounted on said second cable and movable therewith between a locking position wherein said second latch is in a position to engage said second keeper and a release position wherein said second latch is out of the position to engage said second keeper, whereby movement of said lock mechanism between the locked position and the unlocked position thereof moves said latches between the locking positions and the release positions thereof.

8. The drawer locking system set forth in claim 7, wherein lubric glides are provided for guiding said cables to accommodate movement thereof with said lock mechanism.

9. The drawer locking system set forth in claim 7, wherein both of said pedestals have a plurality of drawers mounted therein having a corresponding plurality of keepers thereon, and a corresponding plurality of latches are mounted on said cables for engagement respectively with said keepers.

10. The drawer locking system set forth in claim 7, wherein said latches may be shifted along the associated cable to any adjusted position thereof.

11. The drawer locking system set forth in claim 10, wherein indicia are provided on said pedestals for indicating the position of said latches along said cables.

12. The drawer locking system set forth in claim 7, and further comprising a first stop arm carried on each of said first drawers adjacent to the rear end thereof, said first latch in the release position thereof being out of alignment to engage said first keeper and in alignment to engage said first stop arm, and a second stop arm carried on said second drawer adjacent to the rear thereof, said second latch in the release position thereof being out of alignment to engage said second keeper and in alignment to engage said second stop arm.

13. The drawer locking system set forth in claim 12, wherein said latches in the locking position thereof are out of alignment with the respective stop arms, whereby operation of said locking mechanism to move said latches to the release positions thereof permits movement of said drawers from the fully closed position to the fully open position thereof wherein said stop arms respectively engage said keepers and subsequent operation of said locking mechanism to move said latches to the locking positions thereof moves said latches out of alignment with the respective stop arms to permit full removal of said drawers from the associated pedestal.

14. A drawer locking system for a double pedestal desk comprising a desk top including a substantially flat top plate, an edging extending around the periphery of said top plate and including a dependent side flange, a first pedestal mounted below one end of said desk top and including a first body having a first drawer support structure therein, at least one first drawer mounted in said first pedestal on said first support structure for movement inwardly and outwardly with respect thereto and having a first keeper thereon, a second pedestal mounted below the other end of said desk top and including a second body having second drawer support structure therein, at least one second drawer mounted into said second pedestal on said second support structure for movement inwardly and outwardly with respect thereto and having a second keeper thereon, lock mechanism mounted on said side flange and movable between a locked position and an unlocked position, a first latch channel mounted in said first pedestal adjacent to the path of movement of said second drawer, a second latch channel mounted in said second pedestal adjacent to the path of movement of said second drawer, a first cable having one end connected to said lock mechanism and extending to said first latch channel and downwardly therethrough, a second cable having one end connected to said lock mechanism and extending to said second latch channel and downwardly therethrough, first resilient means interconnecting the other end of said first cable and said first pedestal at a point below said first drawer to hold said first cable taut in all positions of said lock mechanism, second resilient means interconnecting the other end of said second cable and said second pedestal at a point below said second drawer to hold said second cable taut in all positions of said lock mechanism, a first latch mounted on said first cable for reciprocating movement therewith in said first latch channel between a locking position wherein said first latch is in a position to engage said first keeper and a release position wherein said first latch is out of the position to engage said first keeper, and a second latch mounted on said second cable for reciprocating movement therewith in said second latch channel between a locking position wherein said second latch is in a position to engage said second keeper and a release position wherein said second latch is out of the position to engage said keeper, whereby movement of said lock mechanism between the locked position and the unlocked position thereof moves said latches between the locking positions and the release positions thereof.

15. The drawer locking system set forth in claim 14, wherein said latches are individually vertically adjustable with respect to the associated cable within the associated latch channel.

16. The drawer locking system set forth in claim 14, wherein said lock mechanism is disposed generally centrally with respect to the front side flange on said desk top, and a plurality of lubric guides is provided to direct said cables from said lock mechanism into the respective latch channels therefor.

17. In a drawer locking system for a desk having a generally vertically arranged latch channel adjacent to a drawer therein, the latch channel having a rear retaining flange and a front retaining flange defining a channel therebetween with a cable extending downwardly through the channel, a drawer latch comprising a guide block for mounting between the associated front and rear retaining flanges and for vertical reciprocation in the associated channel, said guide block having a dovetail shaped recess extending vertically therethrough on one side thereof, a latch block having a tenon on one side thereof shaped complementarily to said dovetail shaped recess and disposed therein, a latch extending outwardly from the other side of said latch block and disposed in use outwardly with respect to the associated latch channel, said guide block and said latch block receiving therebetween an associated cable, one of said blocks having an opening therethrough in alignment with the associated cable, and a fastener extending through said opening and engaging the associated block and bearing against the associated cable and pushing the associated cable against the other of said blocks, whereby fixedly to position said blocks with respect to each other and fixedly to position the associated cable with respect to said blocks.

18. The combination set forth in claim 17, wherein, the other one of said blocks has a vertically extending groove therein for receiving the associated cable therethrough.

19. The combination set forth in claim 17, wherein, said guide block has a longitudinally extending groove in one surface thereof for receiving the associated cable, said latch block has a threaded opening therein in alignment with said groove, and said fastener is a screw threadedly engaging in said threaded opening and bearing against the associated cable to clamp the blocks fixedly with respect to each other and to fixedly position said blocks with respect to the associated cable.

20. A drawer locking system for a desk comprising a desk top, a pedestal mounted below said desk top and including a body having drawer support structure therein, at least one drawer mounted in said pedestal on said support structure for movement inwardly and outwardly with respect thereto and having a keeper thereon, lock mechanism mounted on said top and movable between a locked position and an unlocked position, a cable extending through said pedestal adjacent to said drawer and having one end connected to said lock mechanism, resilient means interconnecting the other end of said cable and said pedestal at a point below said drawer to hold said cable taut in all positions of said lock mechanism, and a latch mounted on said cable and spaced from the ends thereof and said resilient means and movable with said cable between a locking position and a release position, said latch having a first cam surface on the forward portion thereof engageable with said keeper when said latch is in the locking position and said keeper is in the closed position thereof, and said latch having a second cam surface on the forward portion thereof engageable with said keeper when said latch is in the locking position thereof and said keeper is in an open position thereof, whereby when said locking mechanism is moved to place said latch in the locking position thereof with the drawer in an open position thereof movement of said drawer to the closed position causes said keeper to engage said second cam surface and to move said latch against the urging of said resilient means to permit said keeper to move to the closed position of said drawer after which said resilient means moves said latch to the locking position thereof with respect to said keeper to place said first cam surface in position to engage said keeper.

21. A drawer locking system for a desk comprising a desk top, a pedestal mounted below said desk top and including a body having drawer support structure therein, at least one drawer mounted in said pedestal on said support structure for movement inwardly and outwardly with respect thereto and having a keeper thereon, lock mechanism mounted on said top and movable between a locked position and an unlocked position, a cable extending through said pedestal adjacent to said drawer and having one end connected to said lock mechanism, resilient means interconnecting the other end of said cable and said pedestal at a point below said drawer to hold said cable taut in all positions of said lock mechanism, a latch mounted on said cable and spaced from the ends thereof and said resilient means and movable with said cable between a locking position wherein said latch is in position to engage said keeper and a release position wherein said latch is out of the position to engage said keeper, whereby movement of said lock mechanism between the locked position and the unlocked position thereof moves said latch between the locking position and the release position thereof, and a stop arm carried adjacent to the rear of said drawer, said latch in the locking position thereof being in alignment to engage said keeper and said latch in the release position thereof being out of alignment to engage said keeper and in alignment to engage said stop arm.

22. The drawer locking system set forth in claim 21, wherein said latch in the locking position thereof is out of alignment with said stop arm, whereby operation of said lock mechanism to move said latch to the release position thereof permits movement of said drawer from the fully closed position to the fully open position wherein said stop arm engages said keeper and subsequent operation of said locking mechanism to move said latch to the locking position thereof moves said latch out of engagement with said stop arm to permit full removal of said drawer from said pedestal.

23. A drawer locking system for a desk comprising a desk top including a substantially flat top plate, an edging extending around the periphery of said top plate and including a dependent side flange, a pedestal mounted below said desk top and including a body having drawer support structure therein, at least one drawer mounted in said pedestal and on said support structure for movement inwardly and outwardly with respect thereto and having a keeper thereon, lock mechanism mounted on said side flange and movable between a locked position and an unlocked position, a latch channel mounted in said pedestal adjacent to the path of movement of said drawer and having the upper end thereof laterally offset with respect to said lock mechanism, a cable having one end connected to said lock mechanism and extending to said latch channel and downwardly therethrough, a lubric guide mounted in the upper end of said latch channel for directing said cable from said lock mechanism into said latch channel, resilient means interconnecting the other end of said cable and said pedestal at a point below said drawer to hold said cable taut in all positions of said lock mechanism, and a latch mounted on said cable for reciprocating movement therewith in said latch channel between a locking position wherein said latch is in a position to engage said keeper and a release position wherein said latch is out of the position to engage said keeper, whereby movement of said lock mechanism between the locked position and the unlocked position thereof moves said latch between the locking position and the release position thereof.

24. A drawer locking system for a desk comprising a desk top including a substantially flat top plate, an edging extending around the periphery of said top plate and including a dependent side flange, a pedestal mounted below said desk top and including a body having drawer support structure therein, at least one drawer mounted in said pedestal and on said support structure for movement inwardly and outwardly with respect thereto and having a keeper thereon, lock mechanism mounted on said side flange and movable between a locked position and an unlocked position, a latch channel mounted in said pedestal adjacent to the path of movement of said drawer, a cable having one end connected to said lock mechanism and extending to said latch channel and downwardly therethrough, resilient means interconnecting the other end of said cable and said pedestal at a point below said drawer to hold said cable taut in all positions of said lock mechanism, and a latch mounted on said cable for reciprocating movement therewith in said latch channel, said latch channel having a rear retaining flange and a front retaining flange defining a channel therebetween with said cable extending downwardly through the channel, said latch including a guide block for mounting between the associated front and rear retaining flanges and for vertical reciprocation in the associated channel, said guide block having a dovetail shaped recess extending vertically therethrough on one side thereof, a latch block having a tenon on one side thereof shaped complementarily to said dovetail shaped recess and disposed therein, a latch member extending outwardly from the other side of said latch block and disposed in use outwardly with respect to the associated latch channel, said guide block and said latch block receiving therebetween said cable, and a fastener extending through said opening and engaging the associated block and bearing against said cable and pushing said cable against the other of said blocks, whereby fixedly to position said blocks with respect to each other and fixedly to position said cable with respect to said blocks.

References Cited

UNITED STATES PATENTS

| | | | |
|---|---|---|---|
| 1,928,265 | 9/1933 | Rand | 312—217 |
| 2,827,353 | 3/1958 | Johnson | 312—221 |
| 2,882,112 | 4/1959 | Jarvi | 312—221 |
| 3,291,547 | 12/1966 | Foster | 312—219 X |
| 3,297,376 | 1/1967 | Barstow | 312—219 |

CASMIR A. NUNBERG, *Primary Examiner.*

UNITED STATES PATENT OFFICE
CERTIFICATE OF CORRECTION

Patent No. 3,360,318                          December 26, 1967

Robert A. Studinski

It is hereby certified that error appears in the above numbered patent requiring correction and that the said Letters Patent should read as corrected below.

Column 6, line 46, after "411" insert -- being more specifically mounted upon the forward one of --; line 47, strike out "being fed around the cable guide 411, the cable 405 is"; column 9, line 7, for "positon" read -- position --.

Signed and sealed this 18th day of February 1969.

(SEAL)
Attest:

Edward M. Fletcher, Jr.
Attesting Officer

EDWARD J. BRENNER
Commissioner of Patents